United States Patent [19]

Forbes et al.

[11] 3,836,782
[45] Sept. 17, 1974

[54] APPARATUS FOR VIEWING A DISTANT FLUORESCENT OBJECT

[76] Inventors: David K. Forbes, 2116 Crownhill Rd., San Diego, Calif. 92109;
Richard B. Nehrich, Jr., 4019 Marlesta Dr., San Diego, Calif. 92111

[22] Filed: May 3, 1968

[21] Appl. No.: 726,617

[52] U.S. Cl.................. 250/461, 250/365, 250/484
[51] Int. Cl. ........................................... G01n 21/38
[58] Field of Search...250/83.3 UV, 71, 88, 83.3 W, 250/365, 461, 484; 313/112; 88/1 U

[56] References Cited
UNITED STATES PATENTS 2,237,193  4/1941  Mobsby ........................... 250/83.3
3,037,418  6/1962  Hildebrand ............................ 88/1

*Primary Examiner*—Malcolm F. Hubler
*Attorney, Agent, or Firm*—R. S. Sciascia; George J. Rubens

[57] ABSTRACT

A portable casing mounts a short arc ultra-violet light source and an optical system for collimating the light from the source and beaming it onto a distant object which has been marked with a fluorescent material. The casing further mounts a conventional telescope for detecting and viewing the resulting fluorescence and a second telescope focused into a spectroscope.

6 Claims, 2 Drawing Figures

PATENTED SEP 17 1974   3,836,782

APPARATUS FOR VIEWING A DISTANT FLUORESCENT OBJECT

The invention described herein may be manufactured and used by or for the Government of the United States of America for governmental purposes without the payment of any royalties thereon or therefor.

BACKGROUND OF THE INVENTION

The invention relates to surveillance apparatus of the type used to illuminate and view an object.

Although it is recognized that the present apparatus may have a variety of uses, the use for which it is particularly intended is that of enabling the identification of friend and foe in certain combat areas in which this identification has presented real and well-known difficulties. For example, in field operations presently being conducted in Vietnam, it frequently is extremely difficult to detect and distinguish enemy personnel infiltrating into certain areas. Accordingly, extensive screening efforts must be conducted although these efforts are of doubtful efficacy and also may result in strained relationships.

Because of these conditions, there have been extensive efforts to develop a system utilizing fluorescent marking materials which can be painted or sprayed on perimeter areas of the encampment to be protected, the idea being that a suitable device could be provided to detect individuals penetrating these areas by viewing the fluorescence that rubs off onto their clothing. Although relatively heavy, powerful, and expensive apparatus could accomplish the desired result, such apparatus has not been forthcoming. In particular, there is no known apparatus which is sufficiently small, compact, inexpensive, and reliable to permit extensive field use.

OBJECTS OF THE INVENTION

It is therefore a primary object of the present invention to provide a readily portable instrument capable of use in a field operation to illuminate and detect the fluorescence imparted by marker materials deposited on perimeter areas of encampments and the like.

A related object is to provide apparatus of this type which readily can be adapted to a variety of other uses.

A further important object is to provide such an apparatus which is capable of detecting and viewing the fluorescence either during daylight or darkness.

Another object is to provide the apparatus with optical systems and light sources capable of illuminating objects at substantial distances.

Other objects are to provide a small, battery-powered, inexpensive, easily portable, and compact apparatus capable of continuous operation over extended periods of time.

SUMMARY OF THE INVENTION

A short arc, ultra-violet light source is mounted in a relatively small casing, the light source, most suitably, being energized by a portable power source, such as a standard 24 volt battery. Means are provided to collect the light generated by the source and to collimate the light into a beam capable of illuminating objects and targets disposed at considerable distances, such as 150 yards or more. Telescopic scanning means, also carried by the casing, are employed to view the fluorescence produced by the illumination and, most suitably, these means include a spectroscope optically coupled to a telescope. Such a spectroscope is particularly important to daytime uses of the apparatus in which sunlight and other light sources produce interfering backgrouds. It also permits fluorescence of the marker material to be viewed as a sharply defined line distinguishable from other background light sources. Another conventional telescope is carried by the casing to initially detect the fluorescence and also to facilitate nighttime use of the apparatus. Particular optical systems and controls provide additional features which materially improve the operation of the apparatus and also are instrumental in minimizing size and expense.

BRIEF DESCRIPTION OF THE DRAWING

A preferred embodiment of the invention as illustrated in the accompanying drawings of which.

DESCRIPTION OF THE PREFERRED EMBODIMENT

Figure 1:
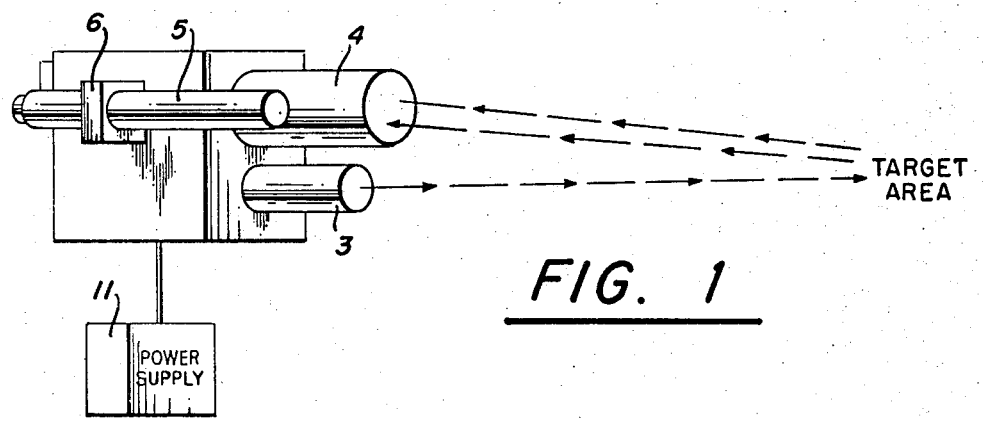
FIG. 1 is a schematic view of the apparatus illustrating its use in a field operation.

Referring first to FIG. 1, the illustrated apparatus includes a casing 1 containing a light source to be described, the light source being powered by a battery 2 and the generated light beamed to the target through a projector 3. The target, which as presently contemplated has been marked with a fluorescent material, is illuminated by the projected beam and the illumination viewed through telescopes 4 and 5 also carried by the casing. Telescope 4 focuses its received image into a spectroscope 6 which permits the fluorescence of the marker material to be viewed as a sharply defined line easily distinguishable from other background light sources.

Markers suitable for viewing by the present apparatus form the subject matter of a related patent application, entitled "Method and Means For Identifying Enemy Forces" filed concurrently herewith by the same inventors, U.S. Pat. Ser. No. 726,615. The marker materials described in this co-pending patent application are formed of chelate materials of the type having a narrow spectral band width capable of being discriminated by a spectroscope-type viewer so as to significantly expand the range and increase the contrast of the object being viewed. The preferred material is selected from a family of europium chelates which show a brightly visible fluorescence when excited by ultra-violet light, these materials also being characterized by their narrow spectral band width. They are colorless and soluble in organic solvents enabling them to be incorporated in a resin or paint marking system and formulation can provide a tacky, sprayable fluid capable of being widely dispersed on foliage or spread on bodies of water. For example, a tacky substance for use on foliage might include a polyester resin, an epoxy resin, a thinner such as Xylol, and Europium chelate dissolved in a small amount of acetonitrile or acetone to provide about 1–5 percent by weight of the chelate in the mixture. A water-borne formulation could include a polyurethane and a europium chelate dissolved in acetonitrile, the mixture to provide about 1–3 percent chelate by weight. A preferred chelate is europium benzolytrifluoroacetonate which exhibits an unusually intense, narrow-band fluorescence that significantly improves the range and contrast of the spectroscopic viewing. As will be appreciated, these materials must remain in a tacky condition so as to be easily picked up by infiltrating personnel of objects. In particular, the formulation should not include any film-forming materials.

Figure 2:
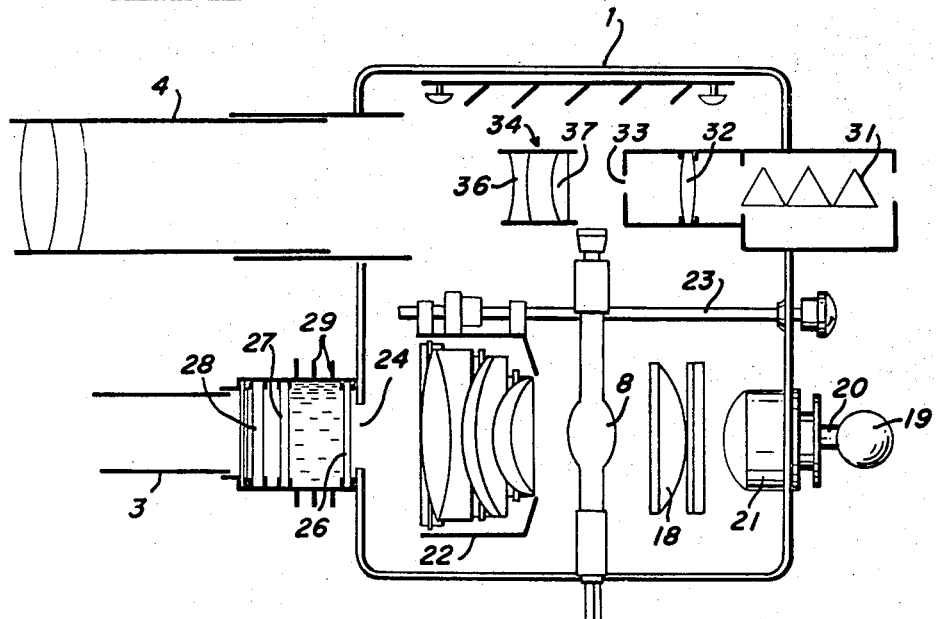
FIG. 2 is a somewhat schematic sectional view of the apparatus.
Figure 2:
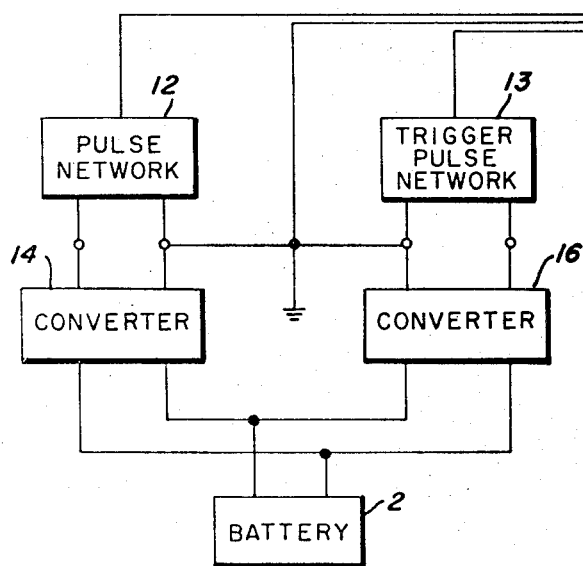

Referring to FIG. 2, the ultra-violet light source is provided by a short arc xenon lamp 8 which, to permit maximum utilization of the generated light as well as the requisite beam, preferably is a short-arc lamp in which the electrode arrangement is such as to produce an arc of about 0.015 inches. Other light sources, such as a mercury short arc lamp, can be substituted, although the xenon type lamp is preferred. Battery 2, which supplies the power for the light source, may be a standard, portable 24 volt nickel-cadmium rechargeable battery. The battery, as well as its pulse-forming circuitry is contained in a small casing 11 which, in actual construction, physically mounts lamp 8 and itself is adjustably mounted in casing 1 so as to permit lamp 8 to be raised or lowered a small amount sufficient to direct the projected light beam in different paths.

One feature of the entire apparatus is its portability which permits extensive use in field operations. Use of the battery requires conservation of its power and it is for this reason that the power supply includes a network enabling the light source to be pulsed at rates varying between 1–10 cycles per second. Use of the lowest pulse rate capable of accomplishing the detection or surveillance is desirable for power conservation purposes. As shown in FIG. 2, the pulsing of the battery output is provided in a conventional manner by a pulse network 12 and a variable trigger pulse network 13, both of these networks utilizing converters 14 and 16. Converter 14 converts its DC input to a 2,000 volt AC output which then is applied by pulse network 12 to one of the electrodes of the light source. Converter 16 converts the DC to a 180 volt AC applied to the other electrode. Manual control of the pulses rate can be achieved in various manners. In FIG. 2, variability simply is accomplished by using an adjustable knob 17 to control a silicon controlled rectifier circuit. Such a circuit acts in its well known manner as an open circuit capable of switching rapidly to a conducting state upon the application of appropriate gate signal. Knob 17 manually controls application of the gate signal. Other pulse-forming means can be employed although the use of the silicon controlled rectifier is presently appropriate due to its commercial availability and relatively small size.

The light generated by the lamp 8 is beamed to the target through projector 3 and, to achieve maximum range and definition, it is most desirable that the optics provide a narrow beam of maximum intensity. Intensity is increased by using a light-gathering spherical mirror 18 is mounted on the rear wall of casing 1 in position to reflect the light rays received by it back into the short-arc light source. More suitably, mirror 18 is adjustably mounted to permit its movement toward or away from the light source and also to permit a universal pivoting movement about its central axis. The mechanism for such mounting can be provided in any conventional manner. As shown, a knob 19 having a stem 20 threadably received in a housing 21 to permit the movement of the mirror toward or away from the light source. A ball joint connection (not shown) is used to permit pivotal motion of the mirror. The reflected light from the mirror, as well as the light generated in a forward direction first passes through a light-gathering optical system supported by a system 22 supported by a rod 23 also carried by casing 1. This system mounts a series of three quartz lenses shaped in manners well-known in the art to gather the light and focus it into a collimated beam capable of passing through a circular opening 24, also provided in casing 1. Projector member 3 is mounted on the casing around opening 24, and, in general, it incorporates conventional filtering elements such as glass filters 26 and 27 and a variable aperture member 28. The glass filters enclose a liquid filter which may be formed of nickel sulphate, the liquid, in addition to filtering, also provides a cooling effect. Radial fins 29 assist in the cooling. Filtering is provided for the obvious purpose of passing only the ultraviolet wave lengths. A system such as that previously described is capable of projecting a narrow beam of ultra-violet light for a distance of upwards of 150 yards.

As already indicated, the light beam is used to illuminate targets or objects which have been marked with the fluorescent material of the type already described. Detection and surveillance of the material is accomplished through telescopes 4 and 5. Telescope 5 is mounted on a side wall of the casing. Its optical arrangement may be of any standard type used to directly enlarge and view an image. If the apparatus is being used at night or during the dark, it may be found that adequate information can be obtained simply by viewing the fluorescence through telescope 5.

During daylight hours in which the sunlight or other light sources can produce confusing background fluorescence, it frequently is desirable to analyze the fluorescence to assure that it is the type being produced by the particular marker that has been deposited on the periphery of the area under consideration. Consequently, one of the significant features of the present apparatus is its inclusion of spectroscope 6 to view and analyze the image received by the second telescope 4. Again, however, telescope 4 may be of any wellknown construction and, of course, it should be adjustable to focus its optical system at varying distances.

Spectroscope 6 also may be provided by most commercially available spectroscopes either of the grating or prism type. The type of spectroscope illustrated in FIG. 2 employs the usual prisms 31 which divide the incoming light waves into separate bands of light according to wavelengths. The spectroscope also mounts an objective lens 32 and its outer end is provided with the customary slit 33 into which the received image must be focused. To focus the present image into the spectroscope, the present apparatus also includes a collimating and focusing unit 34, this unit including a negative lens 36 to collimate the image and a focusing lens 37 to focus the collimated image into slit 33. To retain maximum intensity, the arrangement should be capable of reducing the size of the conical output of lens 37 sufficiently to pass slit 33 and then be received in its entirety by the objective lens 32 of the spectroscope. In other words, the cone of the image at objective lens 32 should be no larger than the lens itself. As has been indicated, arrangements capable of accomplishing these purposes are well-known.

In use, the present apparatus preferably is set up in the field on a tripod which permits training and elevation to direct the projected beam at the target under consideration. The pulse network of the battery power supply then can be adjusted to the lowest possible rate which permits the intended surveillance. This rate, of course, will vary with the type of marker being used and with the operating conditions in which it is used. For example, a lower pulse rate can be employed during darkness than might be needed during bright sunlight. Also, mirror 18 can be adjusted to assure maximum intensity of the illumination and surveillance and the adjustment can be made by viewing the fluorescence through either of the telescopes. It is conceivable also that the projected beam may produce an illumination which is out of the field of either of the telescopes although, since the optical axes of the telescopes are substantially parallel with the optical axis of the projected beam, such a condition is unlikely. If it should occur, it is possible to vary the axis of the projected beam by adjusting the vertical heighth of light source 8.

During a nighttime operation, the fluorescence can be viewed through telescope 5 and, as indicated, such surveillance might provide adequate information. In any event, it may be desirable particularly when there is a possibility of background light sources, to analyze the fluorescence by viewing it through telescope 4 and spectroscope 6. When spectroscopic analysis is applied to targets utilizing the europium chelate markers, a narrow spectral bank width will be provided by the spectroscope and, since these markers produce a brightly visible fluorescence when excited by ultra-violet light, this band width is very readily detectable even for targets located at substantial distances from the viewer. In other words, the spectroscope can be used to distinguish between fluorescence materials on the basis of band width and color. The apparatus as a unit is unusually light and compact. In addition, its portability and relative low cost make it a practical unit for widespread field operations.

Obviously many modifications and variations of the present invention are possible in the light of the above teachings. It is therefore to be understood that within the scope of the appended claims the invention may be practiced otherwise than as specifically described.

What is claimed is:

1. Apparatus for illuminating and viewing a distant fluorescent target comprising
   a casing,
   a short-arc ultra-violet light source mounted in said casing,
   means for energizing said source,
   beam-forming means for illuminating said target with light from said source, and
   telescopic sighting means carried by said casing for sighting the target and viewing the fluorescence produced by said ultra-violet illumination,
   a spectroscope for distinguishing the light from the fluorescent target from other background light,
   the optical axes of said beam and said sighting means being closely spaced and substantially parallel.

2. The apparatus of claim 1 wherein said telescopic sighting means includes:
   a first telescope,
   a second telescope,
   a spectroscope, and
   means for focusing the image of the fluorescence received by said second telescope into said spectroscope,
   said first and second telescope having parallel optical axes whereby said illumination can be viewed by said first telescope and spectrographically analyzed through said second telescope.

3. The apparatus of claim 2 wherein said light source energizing means includes:
   a battery, and
   circuit means coupling said battery output to said source,
   said circuit means including control means for pulsing the battery output at a rate variable between 1-10 cps.

4. The apparatus of claim 2 wherein said source is adjustable for controlling the direction of the optical axes of said beam, said short arc having a length of about 0.015 inches.

5. The apparatus of claim 4 wherein said focusing means is provided by an optical system including a negative lens and a focusing lens, and
   said spectroscope includes a slit aperture and an objective lens,
   said optical system of the focusing means being arranged to focus said image in said slit and restrict the size of the image to the size of said spectroscope objective lens.

6. The apparatus of claim 4 wherein said beam-forming means includes a spherical mirror adjustably mounted in said casing behind said light source for reflecting light back into said short-arc source.

* * * * *